(12) United States Patent
Johnston et al.

(10) Patent No.: US 11,886,867 B2
(45) Date of Patent: Jan. 30, 2024

(54) WORKFLOW PATCHING

(71) Applicant: INTERNATIONAL BUSINESS MACHINES CORPORATION, Armonk, NY (US)

(72) Inventors: Michael Johnston, Dublin (IE); Vasileiadis Vasileios, Dublin (IE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/949,741

(22) Filed: Nov. 12, 2020

(65) Prior Publication Data

US 2022/0147344 A1 May 12, 2022

(51) Int. Cl.
*G06F 8/656* (2018.01)
*G06F 9/50* (2006.01)

(52) U.S. Cl.
CPC ............ *G06F 8/656* (2018.02); *G06F 9/5027* (2013.01)

(58) Field of Classification Search
CPC ............................... G06F 8/656; G06F 9/5027
USPC ......................................................... 717/171
See application file for complete search history.

(56) References Cited

U.S. PATENT DOCUMENTS

| | | | |
|---|---|---|---|
| 7,281,018 B1 * | 10/2007 | Begun | G06F 40/143 707/999.102 |
| 7,565,640 B2 | 7/2009 | Shukla | |
| 8,335,773 B2 | 12/2012 | Balko et al. | |
| 9,778,921 B2 * | 10/2017 | Quennesson | G06F 8/51 |
| 10,528,617 B2 | 1/2020 | Poddar et al. | |
| 10,552,779 B2 | 2/2020 | Stevens et al. | |
| 2006/0064685 A1 | 3/2006 | Defolo | |
| 2007/0169113 A1 * | 7/2007 | Moore | G06F 8/61 717/174 |
| 2009/0144252 A1 * | 6/2009 | Koch | G06F 16/24528 |
| 2011/0138374 A1 | 6/2011 | Pal | |
| 2011/0214021 A1 * | 9/2011 | Vidal | G06F 11/0715 714/38.1 |
| 2012/0259913 A1 * | 10/2012 | Jawalkar | H04L 67/325 709/203 |
| 2016/0085543 A1 | 3/2016 | Islam et al. | |
| 2017/0286162 A1 | 10/2017 | Corley et al. | |

(Continued)

FOREIGN PATENT DOCUMENTS

CN 111226197 A 6/2020

OTHER PUBLICATIONS

Closha, "Bioinformatics workflow system for the analysis of massive sequencing data", https://bmcbioinformatics.biomedcentral.com/track/pdf/10.1186/s12859-018-2019-3, Feb. 19, 2018.

(Continued)

*Primary Examiner* — Chat C Do
*Assistant Examiner* — Bradford F Wheaton
(74) *Attorney, Agent, or Firm* — Nicholas A. Welling

(57) ABSTRACT

Various embodiments are provided for patching of workflows in a computing environment by one or more processors in a computing system. One or more patches may be extracted from a source workflow. The target workflow in a plurality of nodes may be statically or dynamically modified by applying the one or more patches to the target workflow. The one or more of the plurality of nodes may be added, removed, or modified in the target workflow while the target workflow is active according to applying the one or more patches.

14 Claims, 12 Drawing Sheets

(56) References Cited

U.S. PATENT DOCUMENTS

| | | |
|---|---|---|
| 2019/0056926 A1 | 2/2019 | Lindholm et al. |
| 2019/0163463 A1* | 5/2019 | Bulut ..................... G06F 8/65 |
| 2021/0014127 A1* | 1/2021 | Iyengar .............. H04L 41/0631 |
| 2021/0264202 A1* | 8/2021 | Kalluri ................. G06F 9/3005 |

OTHER PUBLICATIONS

Balderrama et al., "GinFlow: A Decentralised Adaptive Workflow Execution Manager" https://ieeexplore.ieee.org/abstract/document/7516089, 2016.

Anonymous "Dynamic Update" https://docs.microsoft.com/en-us/dotnet/framework/windows-workflow-foundation/dynamic-update Mar. 30, 2017 (p. 8).

Duan, R. et al., "Automating Patching of Vulnerable Open-Source Software Versions in Application Binaries" Feb. 2019.

Anonymous "Method and System for Dynamic and Auto-Adaptive Workflow Creation" May 26, 2020 (p. 6).

Anonymous "Dynamic Workflow System Based on Social Information" Apr. 8, 2019 (p. 6).

Anonymous Dynamic Cost Based Optimization Using Branch Prediction for Workflow Based Systems Aug. 11, 2009 (p. 5).

* cited by examiner

WORKFLOW PATCHING

BACKGROUND

The present invention relates in general to computing systems, and more particularly to, various embodiments for static or dynamic patching of workflows in a computing environment in a computing system using a computing processor.

SUMMARY

According to an embodiment of the present invention, a method for static or dynamic patching of workflows in a computing system is provided. One or more patches extracted from a source workflow may be applied to a target workflow in a plurality of nodes. The one or more of the plurality of nodes in the target workflow may be added, removed, or modified while the target workflow is active in response to applying the one or more patches.

In an additional embodiment, one or more patches may be extracted from a source workflow. The target workflow in a plurality of nodes may be statically or dynamically modified by applying the one or more patches to the target workflow. The one or more of the plurality of nodes may be added, removed, or modified in the target workflow while the target workflow is active in response to applying the one or more patches.

In another embodiment, one or more patches may be extracted from a source workflow. The target workflow in a plurality of nodes may be statically or dynamically modified by applying the one or more patches to the target workflow. A configuration of those of the plurality of nodes in the target workflow may be modified in response to applying the one or more patches. Those of the plurality of nodes and any dependency nodes active or inactive in the target workflow may be identified and selectively removed in response to applying the one or more patches.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for static or dynamic patching of workflows in a computing environment are provided.

DETAILED DESCRIPTION OF THE DRAWINGS

Figure 1:
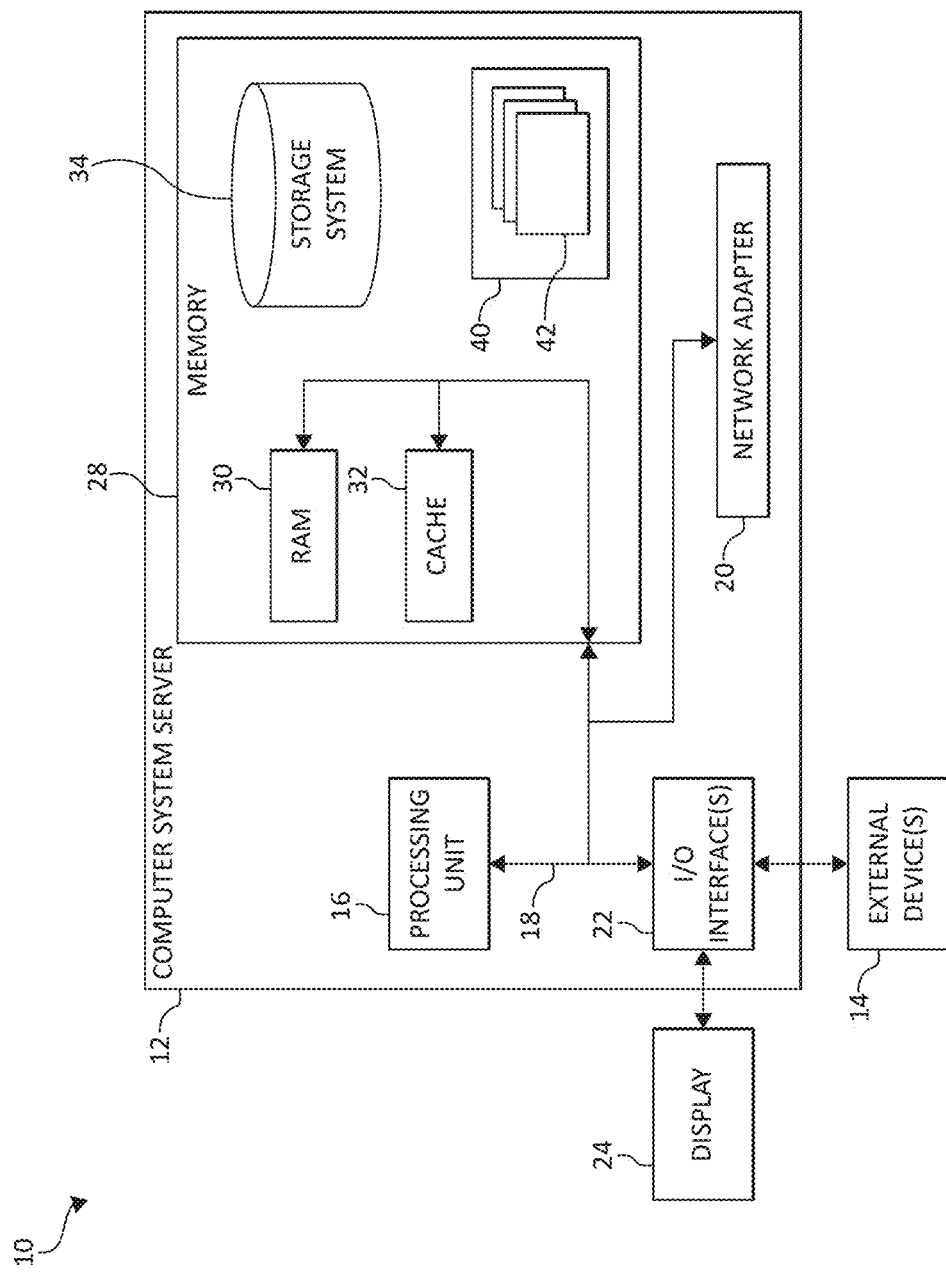
FIG. 1 is a block diagram depicting an exemplary cloud computing node according to an embodiment of the present invention.

Computing resources are usually pre-configured by vendors at fixed levels of configurations. One aspect is that each individual computing resource, such as memory size, number of CPUs, disk size, etc., has a limited boundary. Another aspect is that each computing platform has a limited number of physical customization options. Today's workloads are running under these limitations, which subsequently is a reason that techniques such as memory swapping and caching optimization are used in computing environments.

For example, generally speaking, cloud computing provides the illusion of an infinite pool of resources and elastically provisions and de-provisions resources to users. This dynamic provisioning comes at cost for performance-sensitive workloads such as, for example, deep learning training and high-performance computing ("HPC"). These workloads require provisioned resources to be in the closest proximity possible to achieve optimal execution times. These workloads have alternate compute and communication cycles and the rate of progress is limited by the machine with slowest compute cycle and the longest communication cycles to other machines.

Workflow management provides an infrastructure for the set-up, performance and monitoring of defined tasks in a process that may be arranged as a workflow. Current workflow systems assume that a model of the process is available and the main task of the system is to ensure that all the activities are performed in the right order and the process terminates successfully. Individual tasks of a workflow process may depend on the completion of a previous task before starting and completing a subsequent task. A delay in completing any previous tasks at any stage of the process may have a cascading effect which may in turn delay the completion of the subsequent tasks, therefore delaying the completion of the entire process.

Some applications have been making use of workflow schedulers to accelerate job performance such as, for example, the rate of research for a scientist. For example, workflow schedulers enable an end user (e.g., a scientists) to focus on particular subject (e.g., research of the scientist) using high performance computing (HPC) and cloud resources without the need for expertise on HPC/cloud computing. Workflows also promote the idea of reproducible and portable pipelines. In turn, this enables a user (e.g., scientists, researchers, etc.) to share information such as, for example, the scientist's research with any other entities (e.g., a research team). Intuitively, workflows are as impactful for research as containers are for cloud computing. Of course, end users such as, for example, scientists are not limited to just using a workflow. The user may also modify a workflow, and typically do, to adjust it for their needs. A workflow may be retrieved from a library. The workflow may be adjusted to add, remove, modify nodes before launching the workflow on some HPC/cloud infrastructure. Once the workflow terminates, researchers/tools analyze the outputs of the workflow and may use this information to improve the workflow. This feedback loop can be repeated numerous times until a desired outcome is reached.

Working with workflows becomes complex when the end users wish to modify an active workflow. This is a particularly challenging operation which is why workflow users typically stop, modify, and then restart a workflow via static patching. Static patching is much more straightforward, but can lead to a loss of progress because stopping a workflow may result in immediate termination of tasks of nodes. As such, a need exists to enables user to modify a workflow either statically (i.e. while the workflow is not active) or dynamically.

Accordingly, various embodiments of the present invention provide for static or dynamic patching of workflows. In one aspect, a patch may be extracted from a source workflow and applied to a target workflow. Static patches may 1) inject new nodes, 2) remove nodes from the target workflow, 3) modify any node in the target workflow. Dynamic patches 1) may be applied without requiring the workflow to be stopped and restarted, and/or 2) may modify future tasks of nodes in the target workflow (e.g., nodes that are either active or inactive at the moment of dynamic patching or ones which are actively generating multiple tasks over the course of their lifetime). In one aspect, a "patch" (static or dynamic) may be a computer application patch that is a piece of software that is designed to fix/address problems with a computer program. For example, the patch may be used to correct security vulnerabilities, correct a programming bug (error), improve existing functions, or change software behavior of the computer program. Patches may be applied to a hypervisor, an operating system, middleware, and various other computer software applications.

In one aspect, a workflow may be either statically (i.e. while the workflow is not active) or dynamically modified using a machine learning operation (e.g., artificial intelligence). A machine learning operation may be employed to learn to statically or dynamically modify an extracted patch from a source workflow to a target workflow. The target workflow may be identified using the machine learning operation.

In an additional aspect, mechanisms of the illustrated embodiments enable extracting robust patches from source workflows and apply the extracted patches via static patching or dynamic patching. The dynamic patching may be applied to the target workload without requiring the stopping and/or restarting an active target workflow when performing dynamic patching. In this way, providing the static or dynamic patching of workflows from a source workflow to a target workflow reduces time (e.g., development time), testing, debugging, using an HPC and Cloud infrastructure, and/or the "time-to-market" time for research/products, which utilize workflows during their production cycle. These improvements may also reduce the cost of research and development.

As used herein, a workflow may be a directed acyclic graph. Nodes of the graph may be applications/services and edges of the graph may indicate one or more dependencies between the nodes. A task (e.g., a task of the workflow) may be the execution of an application/service. A workflow orchestrator/manager may be a framework that interprets the configuration of a workflow and its nodes to create, manage, and monitor nodes of the graph.

A scheduler (e.g., a workflow scheduler) may receive instructions from the workflow orchestrator/manager and may process, handle, and/or orchestrate the scheduling, management, and monitoring of tasks. A configuration of a node or "node configuration" may be information that defines the behavior of a node and the node's task(s) including, but not limited to, executable task, arguments to the executable tasks, container image, environment variables, file dependencies, input dependencies to other nodes, backend options (i.e., queue, cluster selectors, etc.), metadata to improve scheduling, and/or error detection and correction, etc.

Additionally, in another aspect, the present invention provides for automatically connecting the inputs of patched-in nodes to the outputs of nodes in the target workflow. One or more conflicts may be detected and resolved between the configuration of the target node, which provide input to patched-in nodes and the expected configuration of input nodes to the patched-in nodes. The mechanisms of the illustrated embodiments further understand various concepts of external dependencies to the workflow (e.g. files that should exist on the filesystem, files provided to the workflow at the moment of its execution, etc.). The dynamic patching, as described herein, also does not require additional software/application code to be implement for the patching operation nor does the dynamic patching require that an active workflow be stopped and restarted for the patching operation to take place. Thus, the dynamic patching supports and enables the removal of existing nodes from the active target workflow along with supporting and enabling the modification of active nodes in the active target workflow. Thus, the dynamic patching may dynamically modify workflows by a) adding new nodes, b) modifying existing ones, c) removing existing nodes without starting, stopping, or restarting of active target workloads.

In an additional aspect, the static or dynamic patching of workflows provides for the resulting workflow to be considered as a brand new workflow, which may re-use artifacts/nodes. Thereby, enabling the static or dynamic patching of workflows to operate with greater freedom and perform bolder changes to the target workflow. The static or dynamic patching of workflows may add new nodes in any sub-workflow, which automatically maps their inputs to existing nodes in the target workflow, removes any node of the target workflow, and/or changes the signature/structure and function of the entire target workflow, etc.

Also, the static or dynamic patching of workflows may operate based on the following set of rules and definitions. A "backend" executes a process or service using some physical/virtual hardware. A backend may be, for example, an OpenShift, Kubernetes, cloud/hybrid-cloud, a load sharing facility ("LSF"), etc. A task may be a process or service that executes on a backend. A workflow node may include information that a backend uses to execute tasks. A workflow manager orchestrates the execution of a workflow and delegates the scheduling decisions for individual tasks of workflow-nodes to a scheduler. A scheduler understands the dependencies between nodes of the workflow. The scheduler determines when a node is ready-to-execute and decides when to execute task(s) for it on some backend. Online/dynamic patching may refer to the process of modifying a workflow while it is active (i.e., at least one of the nodes is either ready-to-execute or is actively running a task on a backend). The patching may add new nodes to the workflow graph, modify existing nodes in the workflow, or delete existing nodes in the workflow. Existing nodes that are modified will only have the modifications reflected by tasks that execute in the future (i.e. after the patch application terminates).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
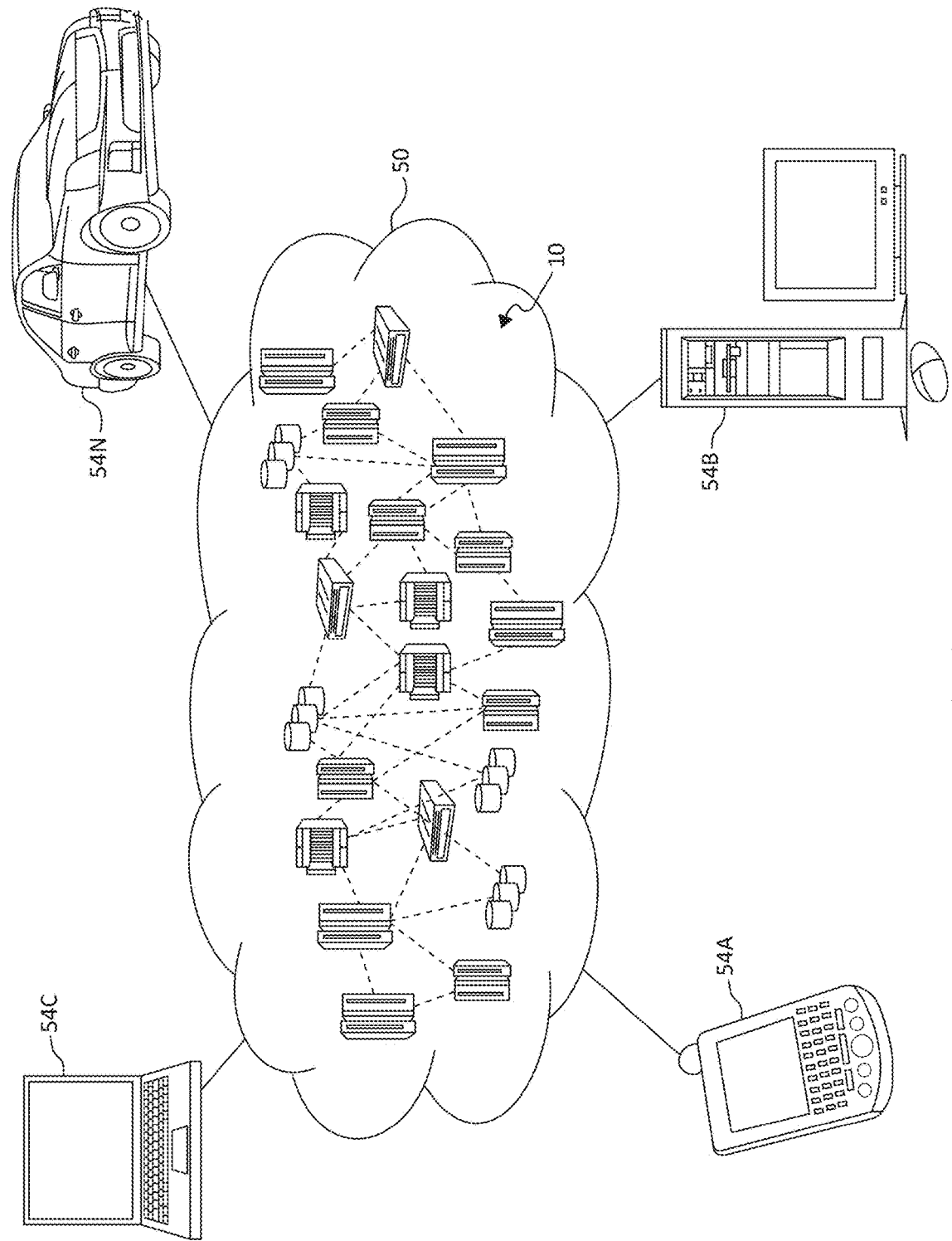
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
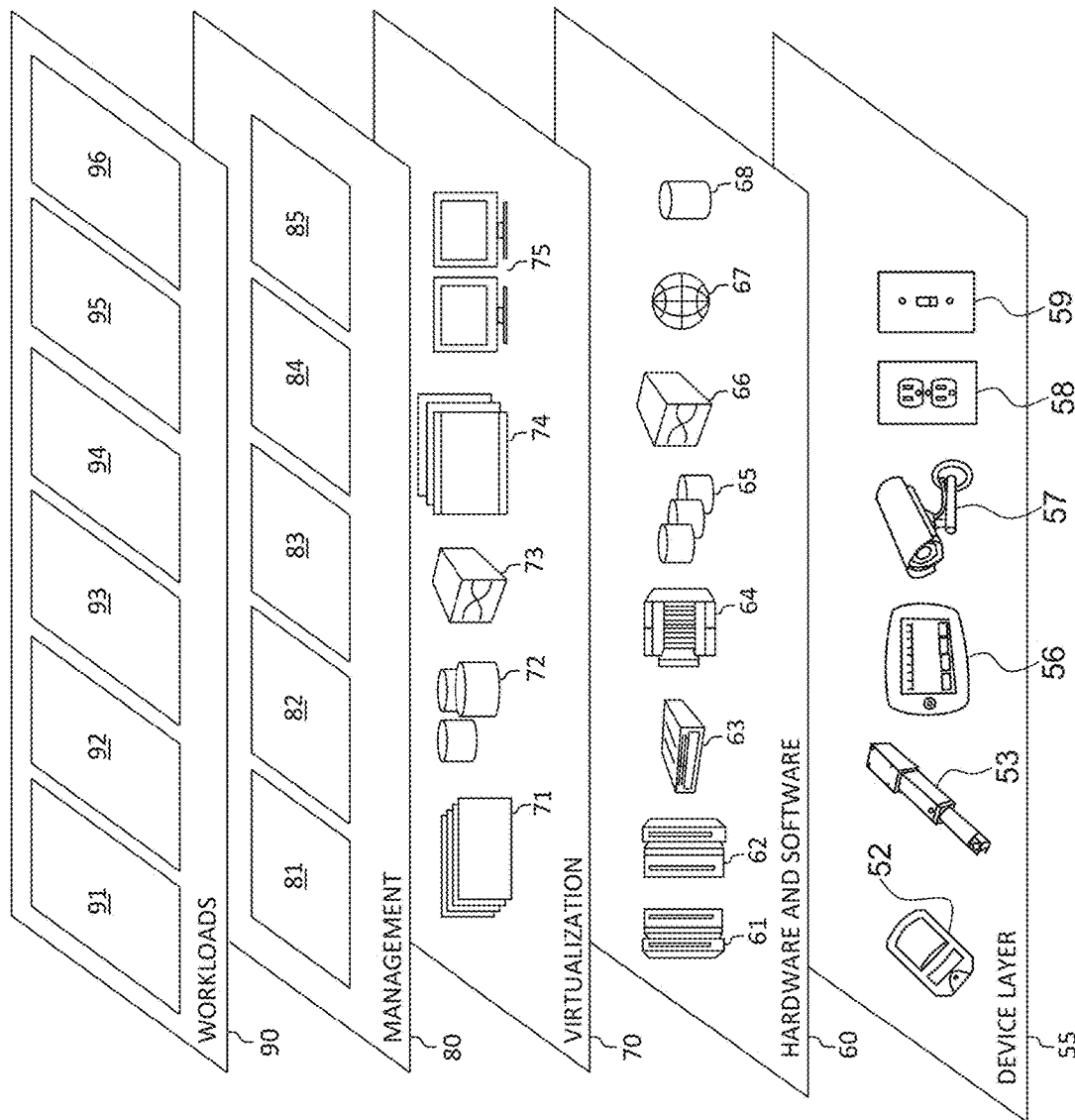
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for static or dynamic patching of workflows in a computing environment (e.g., in a neural network architecture). In addition, workloads and functions 96 for static or dynamic patching of workflows in a computing environment may include such operations as analytics, deep learning, and as will be further described, user and device management functions. One of ordinary skill in the art will appreciate that the workloads and functions 96 for static or dynamic patching of workflows in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing static or dynamic patching of workflows in a computing environment in a computing system. One or more patches may be extracted from a source workflow. The target workflow in a plurality of nodes may be statically or dynamically modified by applying the one or more patches to the target workflow. The one or more of the plurality of nodes may be added, removed, or modified in the target workflow while the target workflow is active in response to applying the one or more patches.

Figure 4:
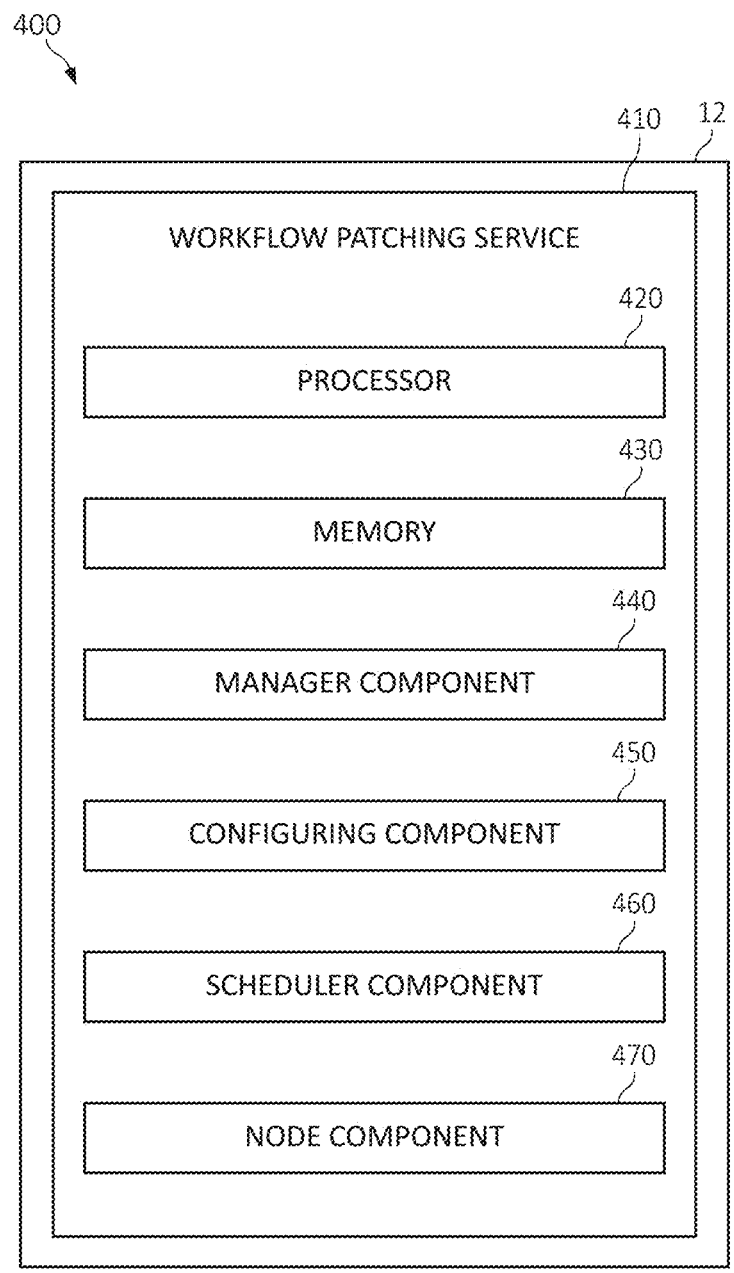
FIG. 4 is an additional block diagram depicting an exemplary functional relationship between various aspects of the present invention.

Turning now to FIG. 4, a block diagram depicting exemplary functional components of system 400 for static or dynamic patching of workflows in a computing environment (e.g., in a neural network architecture) according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

A workflow patching service 410 is shown, incorporating processing unit 420 ("processor") to perform various computational, data processing and other functionality in accordance with various aspects of the present invention. In one aspect, the processor 420 and memory 430 may be internal and/or external to the workflow patching service 410, and internal and/or external to the computing system/server 12. The workflow patching service 410 may be included and/or external to the computer system/server 12, as described in FIG. 1. The processing unit 420 may be in communication with the memory 430. The workflow patching service 410 may include a manager component 440 (e.g., an orchestrator), a configuring component 450, a scheduler component 460, and a node component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In one aspect, the manager component 440, in association with the node component 470, may identify one or more source workflows (e.g., a source workflow with one or more tasks) in a node or group of nodes. The manager component 440 may extract the one or more patches from the source workflow. The manager component 440 may apply one or more patches extracted from a source workflow to a target workflow in a plurality of nodes. That is, the manager component 440 may dynamically or statically apply the one or more patches to the target workflow.

The manager component 440, in association with the node component 470, may identify one or more splice points to apply the one or more patches. A splice point may be a node in the target workflow providing an input to a node identified in the one or more patches.

The manager component 440, in association with the configuring component 450, may add, remove, or modify one or more of the plurality of nodes in the target workflow while the target workflow is active in response to applying the one or more patches.

The manager component 440, in association with the scheduler component 460, may schedule each workflow task in a node or group of nodes. The manager component 440, in association with the scheduler component 460, may restrict any scheduling for additional nodes to the plurality of nodes while applying the one or more patches.

The manager component 440, in association with the configuring component 450, and/or the node component 470, may identify any conflicts between metadata defined in the one or more patches and those of the plurality of nodes in the target workflow. The manager component 440, in association with the configuring component 450, and/or the node component 470, may also generate one or more resolution actions to resolve any identified conflicts to enable the one or more patches compatible with the target workflow.

The manager component 440, in association with the configuring component 450, and/or the node component 470, may initialize of the plurality of nodes included in the one or more patches to be included in the target workflow. In one aspect, the target workflow is an active workflow. The manager component 440, in association with the scheduler component 460, and/or the node component 470, may schedule a node or group of nodes active in the target workflow associated with the one or more patches.

In operation, by way of example only, the following steps may be performed using the workflow patching service 410 and one or more components of the workflow patching service 410 as described in FIG. 4. In step 1) the workflow patching service 410 may extract patch from source workflow. In step 2) the workflow patching service 410 (via the manager component 440 (e.g., an orchestrator)) may instruct the scheduler component 460 not to schedule any new nodes. In step 3) the workflow patching service 410 may remove any "to-delete" (e.g., nodes needed to be deleted from the workflow) and any downstream nodes associated with the "to-be-deleted nodes" from the target workflow. In step 4), the workflow patching service 410 may identify one or more splice points in a target workflow (e.g., nodes of the target workflow which provide inputs to nodes defined in the patch). In step 5), the workflow patching service 410 may identify conflicts between metadata defined in the extracted patch and the nodes in the target workflow (because any conflicts, left untreated, prohibit the application of the patch). In step 6), the workflow patching service 410 may resolve conflicts (e.g., generate actions to enable the patch to be compatible with target workflow). In step 7), the workflow patching service 410 may initialize nodes that exist in the patch, but not the active workflow. In step 8), the workflow patching service 410 may modify configuration of nodes in the target workflow that conflict with patch. In step 9), the workflow patching service 410 may (via the manager component 440 (e.g., an orchestrator)) instruct the scheduler component 460 to schedule any ready-to-execute nodes.

It should be noted that for dynamic patching, each of the above described steps may be executed, while the static patching algorithm may involve only steps 1, 3, 4, 5, 6, 7, and 8 (in this order or any other selected/arranged order of steps 1, 3, 4, 5, 6, 7, and 8). It should also be noted that, in one embodiment, a source workflow and a target workflow may be the same workflow. However, in another embodiment, the source workflow and the target workflow may be different workflows.

Turning now to FIGS. 5A-5E, block flow diagrams 500, 515, 525, 535, and 545 further depicting exemplary systems and functionality for static or dynamic patching of workflows from steps 1-9, above, and described in greater detail. In one aspect, one or more of the components, modules, services, applications, and/or functions described in FIGS. 1-3 may be used in FIG. 4. As will be seen, many of the functional blocks may also be considered "modules" or "components" or "nodes" of functionality, in the same descriptive sense as has been previously described in FIGS. 1-3.

Figure 5A:
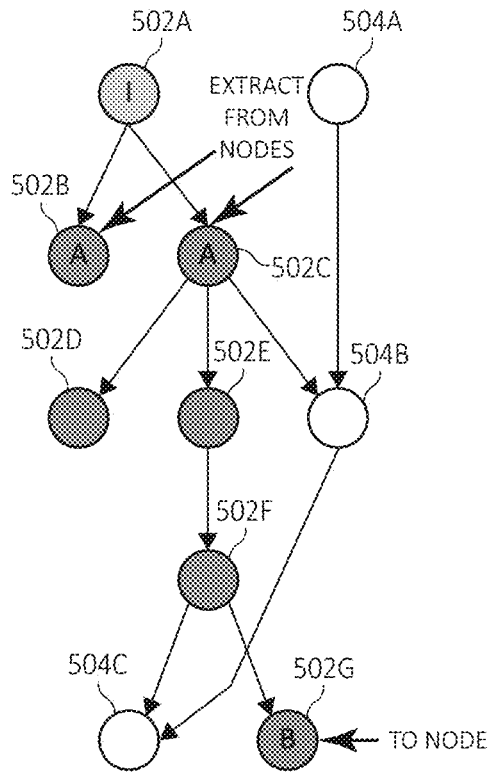
FIGS. 5A-5E are block flow diagram depicting exemplary systems and functionality for static or dynamic patching of workflows in a computing environment by a processor in which aspects of the present invention may be realized.
Figure 5A:
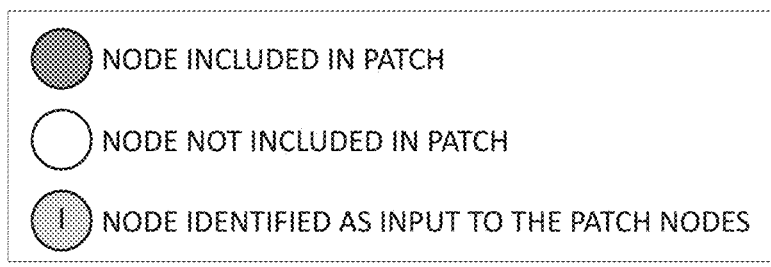
Figure 5B:
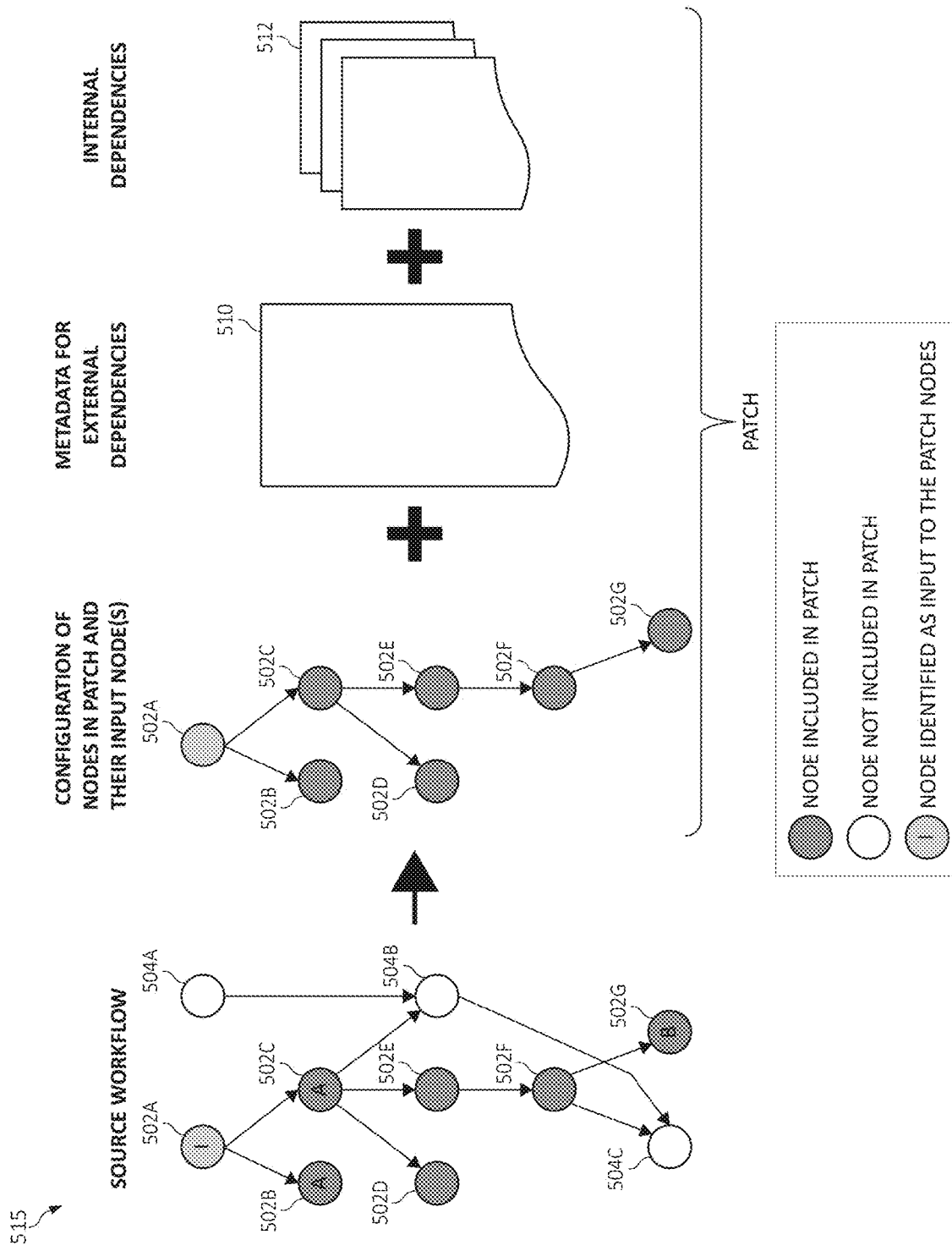

Turning now to FIGS. 5A-5B, work diagrams 500 is an exemplary source workflow describing steps 1) for extracting a patch from source workflow 500.

First, a source workflow having one or more nodes such as, for example, nodes 502A-G and nodes 504A-C may be identified.

Second, a sub-graph of the workflow for extraction such as, the sub-graph including nodes 502A-G, which selects nodes (e.g., nodes 502A-G) that exist in the sub-graph connecting component sets "A" and "B", where outputs of A are (eventually) consumed by B (it includes sets A and B). Also, those nodes not to be extracted and included in the patch may be identified and labeled such as, for example, nodes 504A-C.

Third, step 1) may also include identifying one or more inputs nodes (I) such as, for example, node 502A to the sub-graph of the source workflow 500.

Fourth, the sub-graph dependencies may be partitioned into internal dependencies 512 and external dependencies 510 (e.g., metadata for external dependencies). That is, the internal dependencies 512 may be references to data/files/binaries that are included in the source workflow package. The external dependencies 510 may be references to data, files, binaries that are not part of the source workflow package (e.g. absolute paths to the execution platform filesystem, or references to input data that are provided at execution time).

Fifth, one or more workflow elements (e.g., component configuration, environment variable definitions, node variables, etc.) of the sub-graph may be identified. Sixth, the collected information may be converted into a set of files containing: a) node definitions of the sub-graph and metadata representing dependencies to producer nodes of the sub-graph, and b) node definition of the input to-the-sub-graph nodes, and c) dependencies internal to the source workflow (e.g., binaries, data files).

It should be noted that step 2) for instructing the scheduler component 460 not to schedule any new node may be restricted or exclusively used for the online/dynamic patching operation. As such, operations for performing step 2) for instructing the scheduler component 460 not to schedule any new node may include the following operations.

First, an orchestrator/manager (e.g., manager component 440 of FIG. 4) of a target workflow may inform a scheduler (e.g., scheduler component 460 of FIG. 5) that a patch is being applied. The scheduler reacts by: a) postponing a tagging, labeling, or identifying of nodes as "ready" once the node's input dependencies to upstream nodes are satisfied (e.g., existing active nodes, and associated tasks are not be affected in any way), b) postponing the processing of scheduling events from finished nodes till the patch is done.

Tasks for new nodes are not scheduled for execution, while the patch is taking place even if their dependencies are satisfied to ensure that the "configuration of tasks" does not change while the tasks are scheduled for execution. Also, nodes whose tasks have already been submitted to a backend for execution are not affected. The scheduler may continue submitting tasks on behalf of the nodes as if there was no patch taking place. This way the target workflow does not experience any slowdown due to the patching process.

Figure 5C:
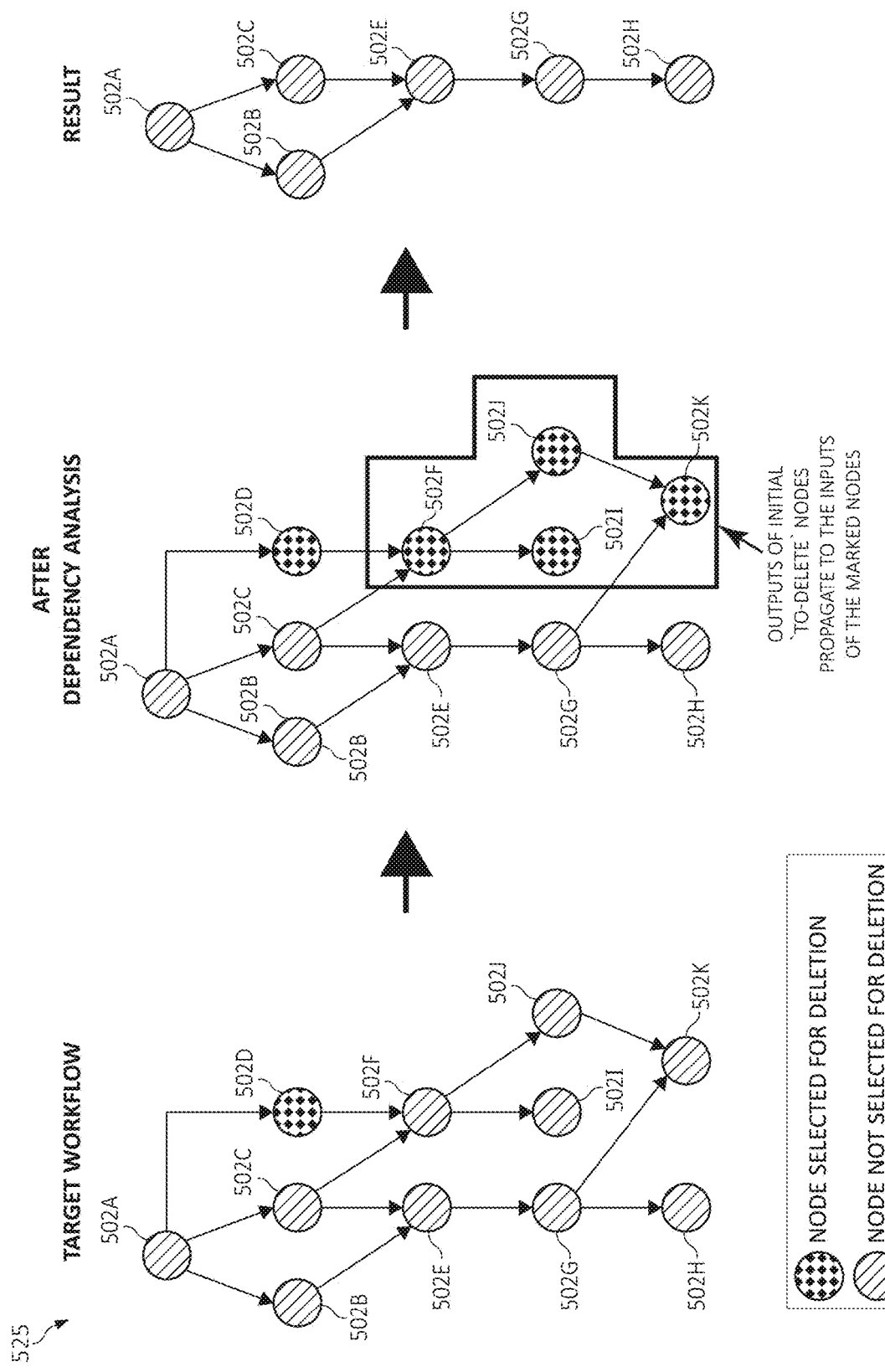

Turning now to FIG. 5C, block flow diagram 525 describes step 3) for removing any "to-delete" (e.g., nodes needed to be deleted from the workflow) and any downstream nodes associated with the "to-be-deleted nodes" from the target workflow.

As depicted in FIG. 5C, mechanisms of the illustrated embodiments provide for both the ability to add new nodes to a target workflow and modify existing ones, but also to remove nodes from the workflow graph. For example, the initial list of "to-delete" nodes (e.g., identifying, tagging, labeling, of nodes to be deleted) can be specified similar to the process of defining a sub-graph as described in step 1), but instead of referencing nodes in the source workflow, the reference nodes are identified in the target workflow. During this operation, the orchestrator/manager discovers and identifies all nodes in the target workflow, which have dependencies to the list of to-delete nodes and adds them to the list of "to-delete" nodes.

The scheduler is notified or informed, by the orchestrator/manager (e.g., manager component 440 of FIG. 4) of a target workflow, that the that tasks associated with the nodes (e.g., the list of "to-delete" nodes) will be terminated in the target workflow and the scheduler is notified or informed to consider the list of "to-delete" nodes as normal terminations. Said differently, the scheduler does not consider the list of "to-delete" nodes as abnormal terminations and errors. A dependency analysis may be performed by the scheduler and determines the outputs of the initial "to-delete" nodes (e.g., nodes a user/machine learning system desires/intends to remove from a target workflow such as, for example, nodes 502F, 502I, 502J, and 502K) propagate to the inputs of the identified list of "to-delete" nodes. The scheduler is notified or informed, by the orchestrator/manager (e.g., manager component 440 of FIG. 4) of a target workflow, to shutdown and terminate the tasks associated with the list of "to-delete" nodes as depicted in FIG. 5C as the resulting target workflow ("result") such as, for example, nodes 502A-H.

It should be noted that the "initial-to-delete" nodes may be one or more sets of nodes that a user and/or machine learning systems desires to remove from the target workflow. After the dependence analysis is complete, the "to-delete" nodes include the "initial-to-delete" node and any other node which directly/indirectly consumes the outputs of the "initial-to-delete" nodes.

For example, the "initial-to-delete" nodes in FIG. 5C is the node 502D (e.g., a node selected for deletion/removal). Applying a dependence analysis (i.e. tracking the outputs of 502D flowing through its downstream workflow nodes), it is discovered that nodes 502F, 502I, 502J, and 502K all directly/indirectly depend to 502D. Specifically, 502F directly consumes the outputs of 502D whereas the rest indirectly (i.e. the path connecting 502D with any of these nodes contains at least one more node).

Figure 5D:
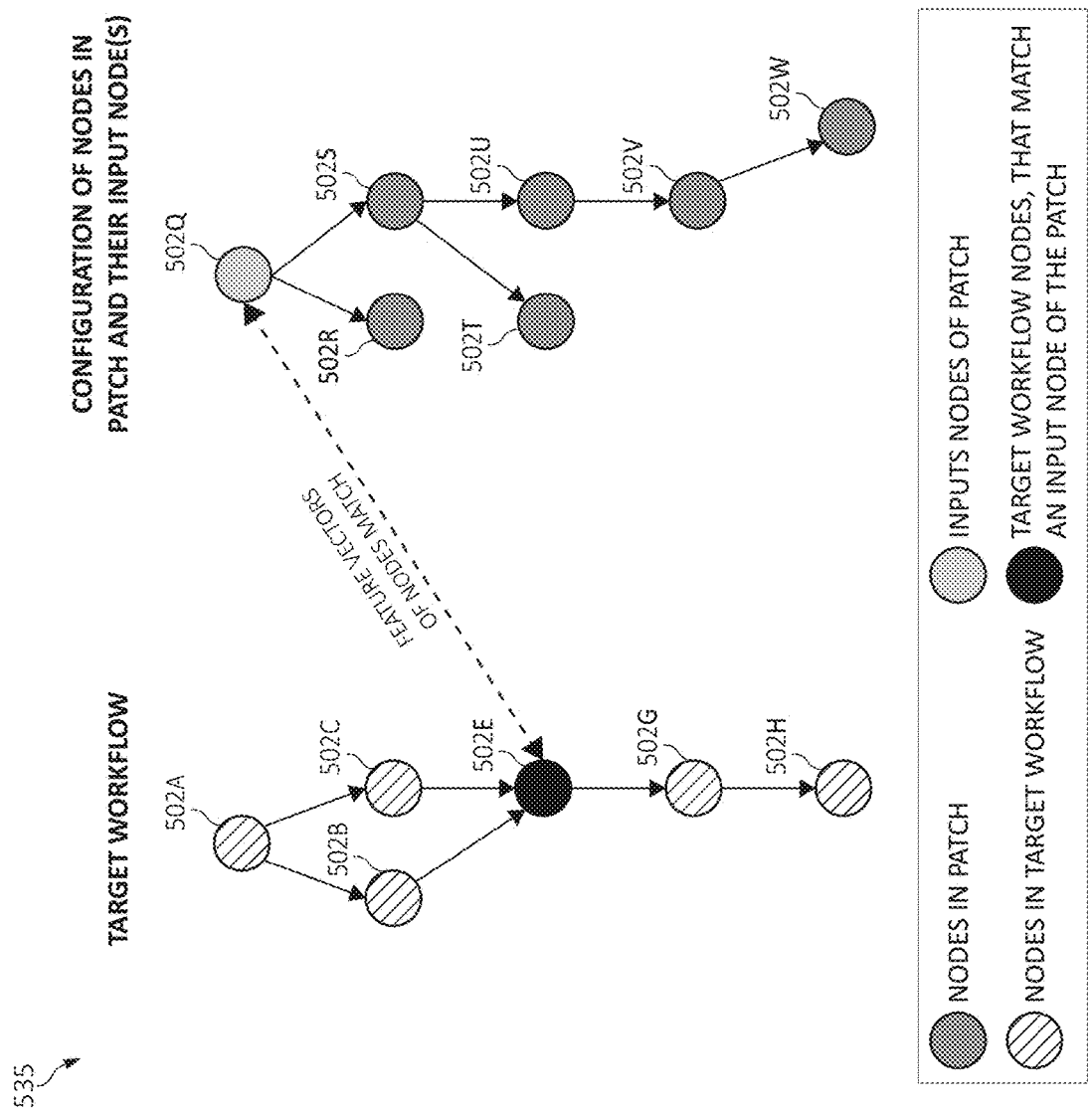

Turning now to FIG. 5D, block flow diagram 535 describes step 4), for identifying one or more splice points in a target workflow (e.g., nodes of the target workflow which provide inputs to nodes defined in the patch).

In one aspect, one or more splice points are nodes of the target workflow. The one or more splice points may be automatically identified such as, for example, by machine learning. A splice point is a node which acts as input node to nodes that exist in the patch. For example, automatic splice point identification may include one or more of the following operations. First, a feature vector may be generated for every input node of the nodes that are included or identified inside the patch (e.g., hereinafter referred to and labeled as "inputs of novel nodes"). The feature vector may be a set of fields such as, for example: ["namespace of node", "name of node", "executable", "arguments"].

Next, feature vectors may be generated for all nodes of a target workflow graph. In an additional embodiment, one or more an input-feature vectors may be generated from one or more root nodes of the patch and compared to one or more output-feature vectors in the target (e.g., matching domains to co-domains). A "feature" (as used in machine learning) may be referred to, for example, in characteristic of any entity. A "feature vector" may be a collection of features. An operation may be executed to identify, find, locate those nodes of the target workflow whose feature vector is similar with the feature vectors of the "inputs of novel nodes" with a similarity factor that is higher than a selected threshold (e.g., a "feature vector match" threshold). Identified matching pairs (e.g., nodes with similar feature vectors) may be recorded. Additionally, a user and/or a machine learning operation may specify which nodes from the target workflow to use as inputs to the nodes contained in the patch by providing pairs of target workflow nodes identifiers (namespace and name) and the "inputs of novel nodes" identifiers.

Thus, as indicated in FIG. 5D, a configuration of node (e.g., nodes 502Q-W) in the patch and their input nodes (e.g., node 502Q) are identified. For example, node 502E from the target workflow has a matching feature vector of node 502Q included in the patch. Node 502Q includes and identifies each of the node dependencies of node 502Q.

At this point, it should be noted that the patch contains information for the "inputs of novel nodes" and patched nodes, which have been extracted from the source workflow. If any of the nodes in the patch already exist in the target workflow then there is a chance that there is a conflict. There is also a chance of conflict between the definition of "inputs of novel nodes" and matching nodes that discovered during step 4. In one aspect, by way of example only, a conflict is a difference between the configuration of two nodes where one nodes is part of the patch and the other node a part of the target workflow. Hence, following step 4), the operations of step 5 may be executed for identifying conflicts between metadata defined in the extracted patch and the nodes in the target workflow. Also, step 5) may traverse the nodes in the target workflow and record any conflicts between the target workflow and the patch.

Following step 5), again, step 6) may be executed where the workflow patching service 410 may resolve conflicts (e.g., generate actions to enable the patch to be compatible with target workflow). In so doing, there may be multiple ways to resolve such conflicts. For example, a tool (e.g., a machine learning operation tool) that employs semantic knowledge and language processing technologies may be employed to determine how to appropriately merge the conflicting configurations of two nodes. In an additional aspect, a machine learning operation may be used to inspect any conflicting information and determine how to resolve the conflict by either: 1) accepting the configuration of the target node, 2) accepting the configuration of the source node, or 3) entering a new configuration that combines the two nodes. Hence, the objective of step 6 is to ensure components/nodes of the patch and existing nodes of the target workflow may each be able to successfully execute each of their tasks.

Figure 5E:
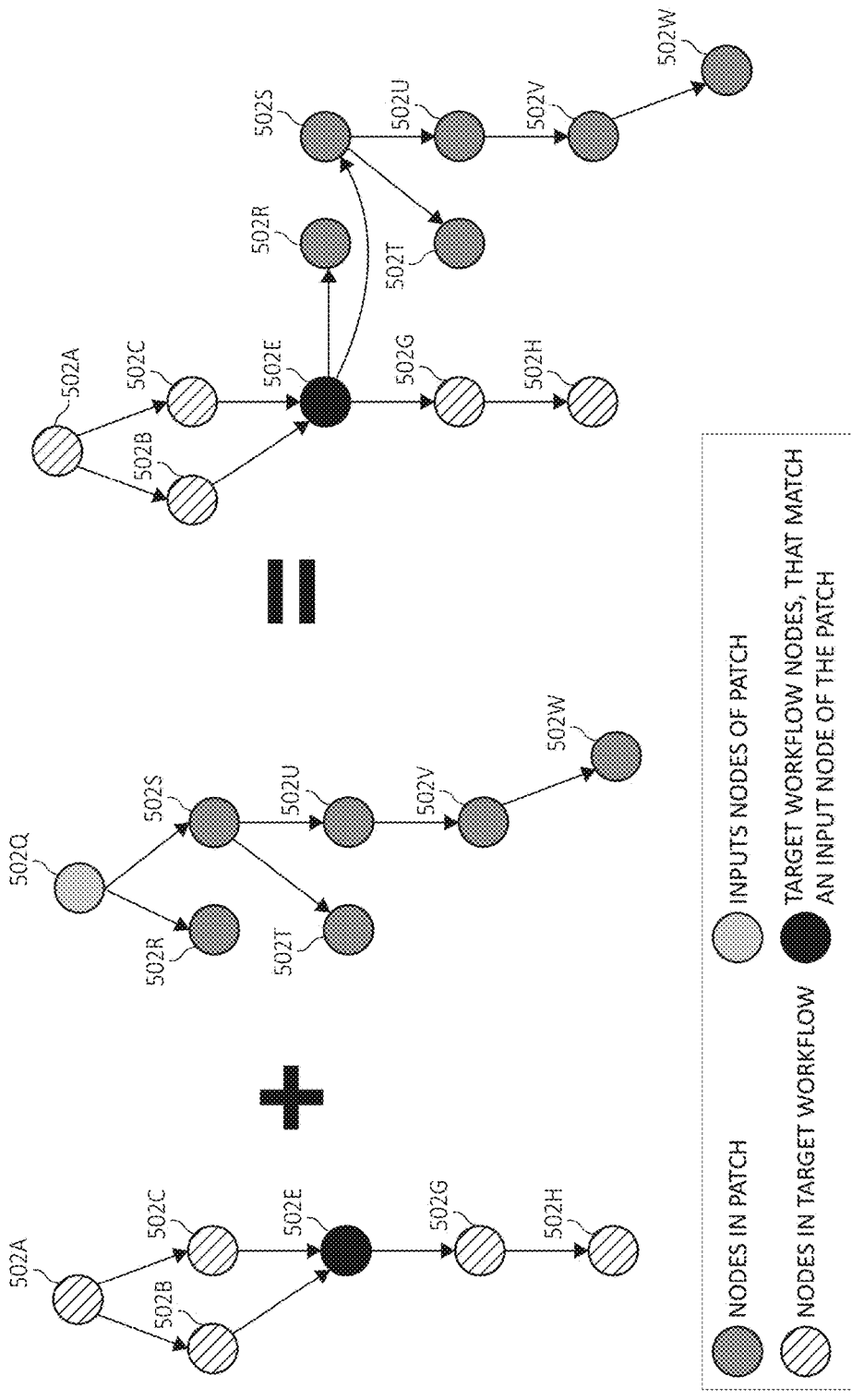

Turning now to FIG. 5E, block flow diagram 545 describes step 7), for initializing nodes that exist in the patch, but not the active workflow. For static patching, each new node may be inserted in the target workflow. The dynamic patching operation provides the list of nodes that are included in the patch, but do not exist in the target workflow. The orchestrator/manager may update its own internal data-structures and initializes the "inputs of novel nodes" with steps including, but not limited to: a) initialization of backend(s), b) changes to files on the filesystem (e.g. copy "internal dependencies" from patch (see step 1) or more information), c) updates to the metadata of target workflow, and/or d) updates to the data-structures of the scheduler, etc.

Following step 7, again, step 8) may be employed for modifying the configuration of nodes in the target workflow that conflict with patch. Included in step 8) the orchestrator/manager of the target workflow may modify the configuration of nodes that conflict with the information contained in the patch. The orchestrator/manager of the target workflow may replay and review the decisions made in step 6). The orchestrator/manager may update its internal data-structures and perform initialization steps for each of the conflicting nodes including, but not limited to: a) initialization of backend(s), b) changes to files on the filesystem (e.g. copy "internal dependencies" from patch (see step 1) or more information), c) updates to the metadata of target workflow, and/or d) updates to the data-structures of the scheduler, etc. Thus, step 8) completes the transformation of the target workflow to include the information encoded in the patch.

Also, step 9), for instructing the scheduler component 460 to schedule any ready-to-execute nodes, may be applicable only to the dynamic patching operation. Included in step 9), the orchestrator/manager of the target workflow may inform the scheduler that the dynamic patching is now complete. The scheduler may a) retroactively handle/process scheduling events that were postponed during step 2), and also b) remove/lift the ban/restriction on scheduling tasks for nodes that were not already ready for execution before the process of dynamic patching started.

Figure 6:
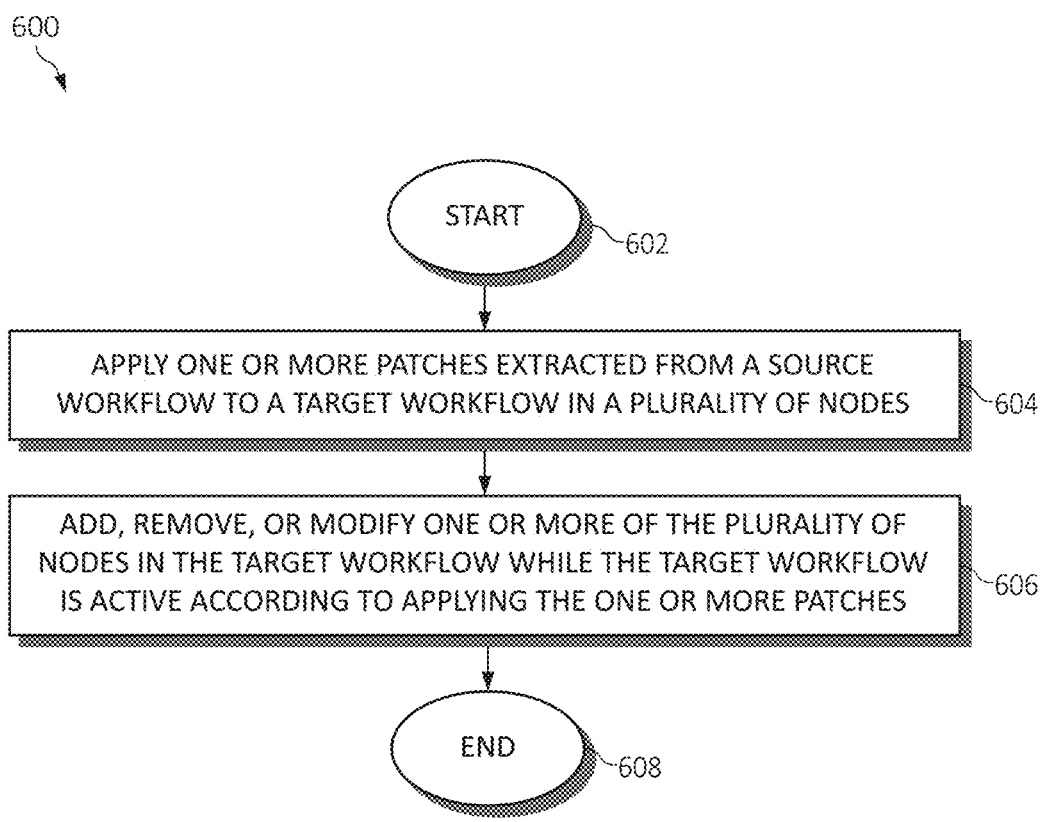
FIG. 6 is a flowchart diagram depicting an exemplary method for static or dynamic patching of workflows in a computing environment by a processor in which aspects of the present invention may be realized.

Turning now to FIG. 6, a method 600 for patching of workflows in a computing environment using a processor is depicted, in which various aspects of the illustrated embodiments may be implemented. The functionality 600 may be implemented as a method (e.g., a computer-implemented method) executed as instructions on a machine, where the instructions are included on at least one computer readable medium or one non-transitory machine-readable storage medium. The functionality 600 may start in block 602.

One or more patches extracted from a source workflow may be applied to a target workflow in a plurality of nodes, as in block 604. The one or more of the plurality of nodes in the target workflow may be added, removed (as indicated via machine learning and/or by a user/administrator), or modified while the target workflow is active according to applying the one or more patches, as in block 606. The functionality 600 may end, as in block 608.

Figure 7:
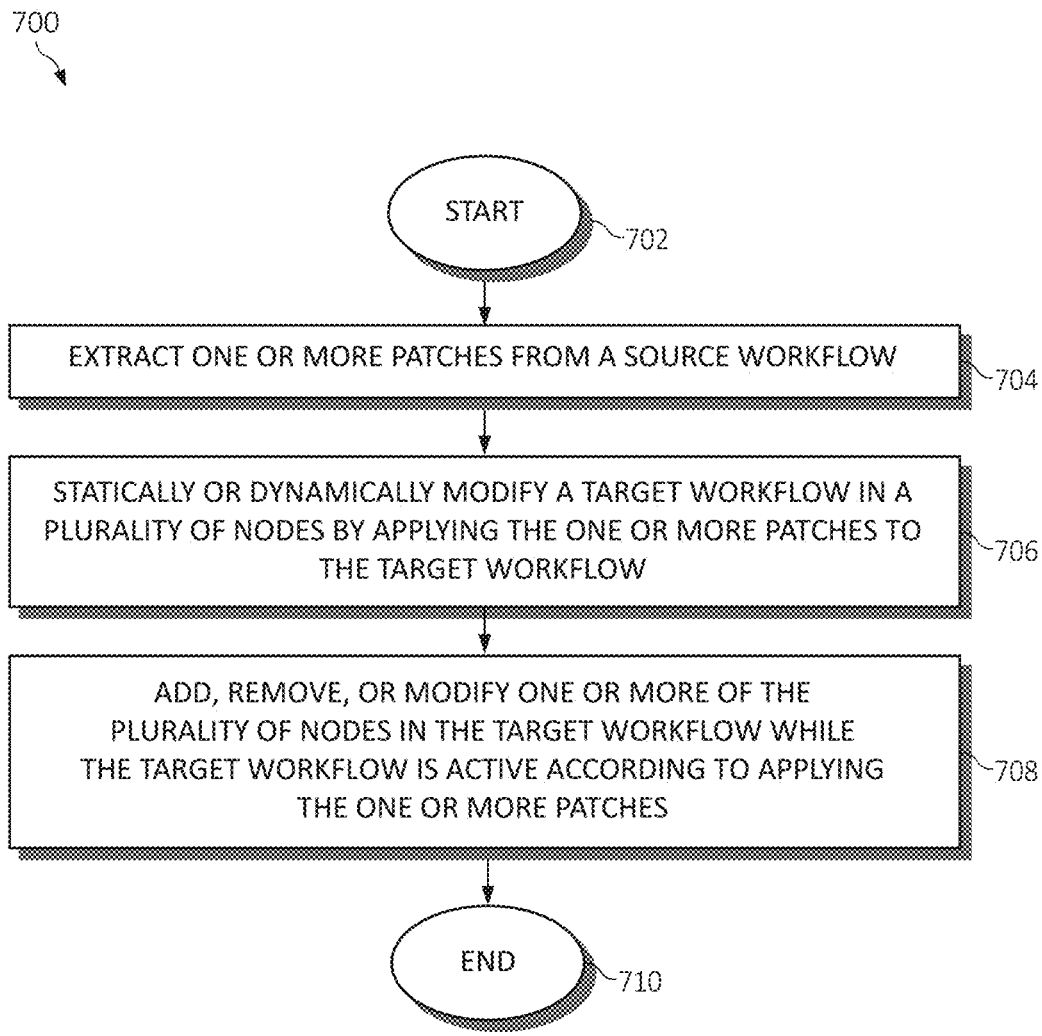
FIG. 7 is a flowchart diagram depicting an exemplary method for static or dynamic patching of workflows in a computing environment by a processor in which aspects of the present invention may be realized.

Turning now to FIG. 7, an additional method 700 for static or dynamic patching of workflows in a computing environment using a processor is depicted. The functionality 700 may be implemented as a method (e.g., a computer-implemented method) executed as instructions on a machine, where the instructions are included on at least one computer readable medium or one non-transitory machine-readable storage medium. The functionality 700 may start in block 702.

One or more patches may be extracted from a source workflow, as in block 704. The target workflow in a plurality of nodes may be statically or dynamically modified by applying the one or more patches to the target workflow, as in block 706. The one or more of the plurality of nodes may be added, removed, or modified in the target workflow while the target workflow is active according to applying the one or more patches, as in block 708. The functionality 700 may end, as in block 710.

Figure 8:
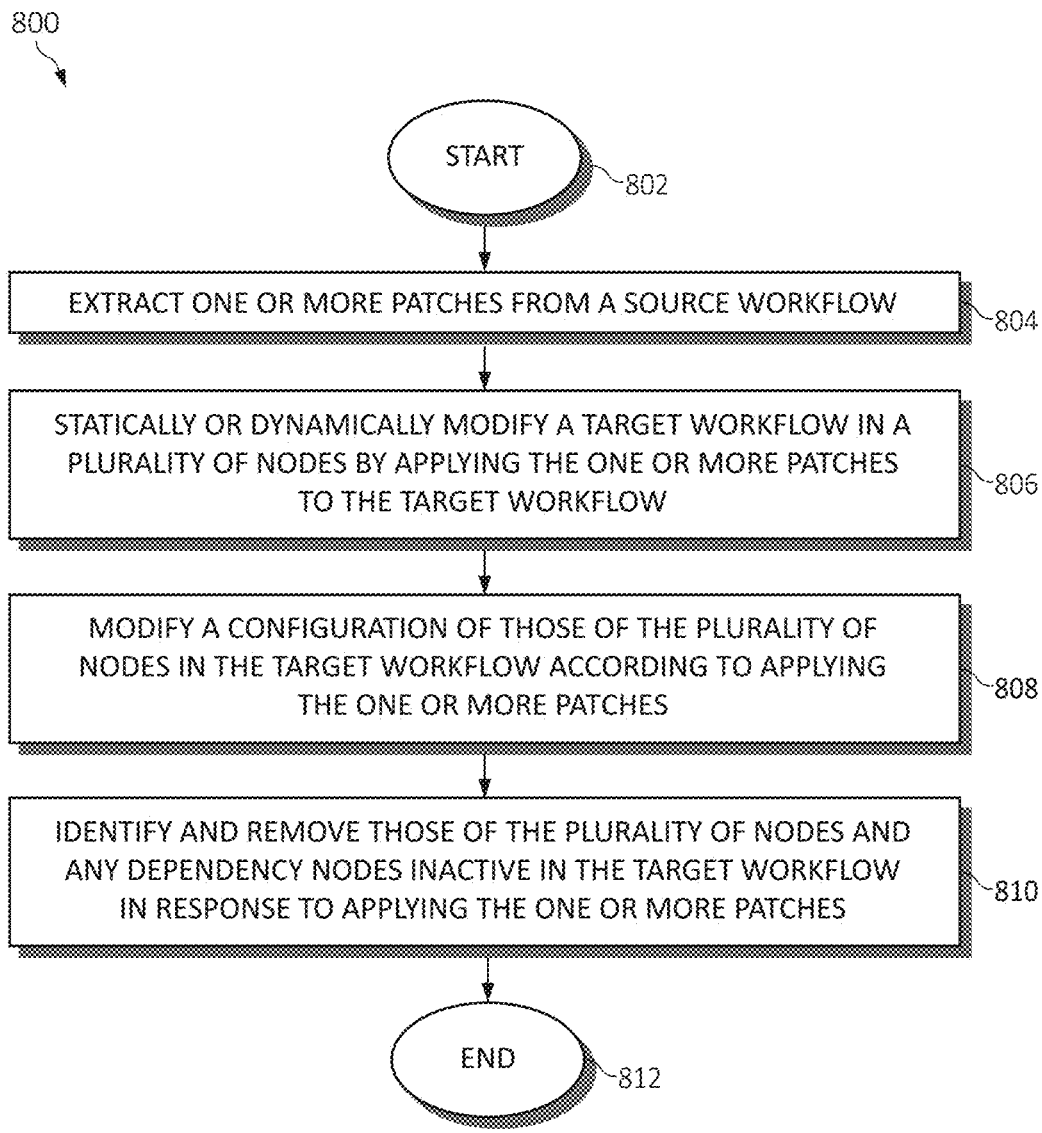
FIG. 8 is a flowchart diagram depicting an exemplary method for static or dynamic patching of workflows in a computing environment in a computing environment by a processor in a computing environment by a processor, again, in which aspects of the present invention may be realized.

Turning now to FIG. 8, an additional method 800 for static or dynamic patching of workflows in a computing environment using a processor is depicted. The functionality 800 may be implemented as a method (e.g., a computer-implemented method) executed as instructions on a machine, where the instructions are included on at least one computer readable medium or one non-transitory machine-readable storage medium. The functionality 800 may start in block 802.

One or more patches may be extracted from a source workflow, as in block 804. The target workflow in a plurality of nodes may be statically or dynamically modified by applying the one or more patches to the target workflow, as in block 806. A configuration of those of the plurality of nodes in the target workflow may be modified according to applying the one or more patches, as in block 808. Those of the plurality of nodes and any dependency nodes active or inactive in the target workflow may be identified and removed in response to applying the one or more patches, as in block 810. In one aspect, the active or inactive (e.g., undesired nodes) may be removed based on machine learning, user preference and not just because the nodes are inherently inactive. The functionality 800 may end, as in block 812.

In one aspect, in conjunction with and/or as part of at least one blocks of FIGS. 6-8, the operations of 600, 700, and/or 800 may include each of the following. The operations of 600, 700, and/or 800 may extract the one or more patches from the source workflow and dynamically or statically apply the one or more patches to the target workflow.

The operations of 600, 700, and/or 800 may restrict any scheduling for additional nodes to the plurality of nodes while applying the one or more patches and identify a splice point to apply the one or more patches. A splice point may be a node in the target workflow providing an input to one or more nodes identified in the one or more patches. The operations of 600, 700, and/or 800 may identify any conflicts between metadata defined in the one or more patches and those of the plurality of nodes in the target workflow, and generate one or more resolution actions to resolve any identified conflicts to enable the one or more patches compatible with the target workflow.

The operations of 600, 700, and/or 800 may generate feature vectors for all nodes of a target workflow graph. In an additional embodiment, the operations of 600, 700, and/or 800 may generate one or more an input-feature vectors from one or more root nodes of the patch and compare the one or more an input-feature vectors to one or more output-feature vectors in the target (e.g., matching domains to co-domains).

The operations of 600, 700, and/or 800 may initialize of the plurality of nodes included in the one or more patches to be included in the target workflow, wherein the target workflow is active, and schedule those of the plurality of nodes active in the target workflow associated with the one or more patches.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for patching of workflows in a computing environment by one or more processors comprising:
   identifying one or more splice points to apply one or more patches extracted from a source workflow to a target workflow in a plurality of nodes, wherein a splice point is a node in the target workflow providing an input to nodes identified in the one or more patches, and wherein the one or more splice points are automatically identified by executing machine learning logic to:
      generate, for each of the nodes identified in the one or more patches, input feature vectors,
      generate, for each node identified in a target workflow graph of the target workflow, target feature vectors,
      compare the input feature vectors with the target feature vectors, and
      select, as the splice point, the node in the target workflow based on the comparison;
   restricting any scheduling for additional nodes to the plurality of nodes while applying the one or more patches, even when upstream dependency nodes of the additional nodes are satisfied for execution, wherein tasks of existing nodes of the plurality of nodes, having already been scheduled for execution, continue to be scheduled;

applying the one or more patches to the target workflow in the plurality of nodes;

respectively adding, removing, and modifying one or more of the plurality of nodes in the target workflow while the target workflow is active according to applying the one or more patches, wherein the removing of the one or more of the plurality of nodes is performed by labeling those of the one or more of the plurality of nodes to be removed on an initial to-delete list, performing a dependency analysis of each node on the initial to-delete list to incorporate dependent nodes of each node on the initial to-delete list into a final to-delete list, and terminating each node on the final to-delete list while notifying a scheduler to recognize the termination of each node a normal termination to abate the scheduler considering the termination as an error;

identifying, by the machine learning logic, any conflicts between metadata defined in the one or more patches and those of the plurality of nodes in the target workflow; and generating one or more resolution actions to resolve any identified conflicts to enable the one or more patches compatible with the target workflow, wherein the one or more resolution actions include executing the machine learning logic to employ a semantic knowledge and language processing operation to determine a satisfactory merging of conflicting configurations of at least two of the plurality of nodes, and wherein the satisfactory merging further includes identifying and implementing, by the machine learning logic, at least one combination of configurations of source nodes and the plurality of nodes in the target workflow to resolve the identified conflicts.

2. The method of claim 1, further including extracting the one or more patches from the source workflow.

3. The method of claim 1, further including dynamically or statically applying the one or more patches to the target workflow.

4. The method of claim 1, further including:

initializing of the plurality of nodes included in the one or more patches to be included in the target workflow, wherein the target workflow is active; and scheduling those of the plurality of nodes active in the target workflow associated with the one or more patches.

5. A system for patching of workflows in a computing environment, comprising:

one or more computers with executable instructions that when executed cause the system to:

identify one or more splice points to apply one or more patches extracted from a source workflow to a target workflow in a plurality of nodes, wherein a splice point is a node in the target workflow providing an input to nodes identified in the one or more patches, and wherein the one or more splice points are automatically identified by executing machine learning logic to:

generate, for each of the nodes identified in the one or more patches, input feature vectors, generate, for each node identified in a target workflow graph of the target workflow, target feature vectors, compare the input feature vectors with the target feature vectors, and select, as the splice point, the node in the target workflow based on the comparison;

restrict any scheduling for additional nodes to the plurality of nodes while applying the one or more patches, even when upstream dependency nodes of the additional nodes are satisfied for execution, wherein tasks of existing nodes of the plurality of nodes, having already been scheduled for execution, continue to be scheduled;

apply the one or more patches to the target workflow in the plurality of nodes;

respectively add, remove, and modify one or more of the plurality of nodes in the target workflow while the target workflow is active according to applying the one or more patches, wherein the removing of the one or more of the plurality of nodes is performed by labeling those of the one or more of the plurality of nodes to be removed on an initial to-delete list, performing a dependency analysis of each node on the initial to-delete list to incorporate dependent nodes of each node on the initial to-delete list into a final to-delete list, and terminating each node on the final to-delete list while notifying a scheduler to recognize the termination of each node a normal termination to abate the scheduler considering the termination as an error;

identify, by the machine learning logic, any conflicts between metadata defined in the one or more patches and those of the plurality of nodes in the target workflow; and generate one or more resolution actions to resolve any identified conflicts to enable the one or more patches compatible with the target workflow, wherein the one or more resolution actions include executing the machine learning logic to employ a semantic knowledge and language processing operation to determine a satisfactory merging of conflicting configurations of at least two of the plurality of nodes, and wherein the satisfactory merging further includes identifying and implementing, by the machine learning logic, at least one combination of configurations of source nodes and the plurality of nodes in the target workflow to resolve the identified conflicts.

6. The system of claim 5, wherein the executable instructions when executed cause the system to extract the one or more patches from the source workflow.

7. The system of claim 5, wherein the executable instructions when executed cause the system to dynamically or statically apply the one or more patches to the target workflow.

8. The system of claim 5, wherein the executable instructions when executed cause the system to:

initialize of the plurality of nodes included in the one or more patches to be included in the target workflow, wherein the target workflow is active; and schedule those of the plurality of nodes active in the target workflow associated with the one or more patches.

9. A computer program product for patching of workflows in a computing environment, the computer program product comprising:

one or more computer readable storage media, and program instructions collectively stored on the one or more computer readable storage media, the program instruction comprising:

program instructions to identify one or more splice points to apply one or more patches extracted from a source workflow to a target workflow in a plurality of nodes, wherein a splice point is a node in the target workflow providing an input to nodes identified in the one or more patches, and wherein the one or more splice points are automatically identified by executing machine learning logic to:
  generate, for each of the nodes identified in the one or more patches, input feature vectors,
  generate, for each node identified in a target workflow graph of the target workflow, target feature vectors,
  compare the input feature vectors with the target feature vectors, and
  select, as the splice point, the node in the target workflow based on the comparison;
program instructions to restrict any scheduling for additional nodes to the plurality of nodes while applying the one or more patches, even when upstream dependency nodes of the additional nodes are satisfied for execution, wherein tasks of existing nodes of the plurality of nodes, having already been scheduled for execution, continue to be scheduled;
program instructions to apply the one or more patches to the target workflow in the plurality of nodes;
program instructions to respectively add, remove, and modify one or more of the plurality of nodes in the target workflow while the target workflow is active according to applying the one or more patches, wherein the removing of the one or more of the plurality of nodes is performed by labeling those of the one or more of the plurality of nodes to be removed on an initial to-delete list, performing a dependency analysis of each node on the initial to-delete list to incorporate dependent nodes of each node on the initial to-delete list into a final to-delete list, and terminating each node on the final to-delete list while notifying a scheduler to recognize the termination of each node a normal termination to abate the scheduler considering the termination as an error;
program instructions to identify, by the machine learning logic, any conflicts between metadata defined in the one or more patches and those of the plurality of nodes in the target workflow; and
program instructions to generate one or more resolution actions to resolve any identified conflicts to enable the one or more patches compatible with the target workflow, wherein the one or more resolution actions include executing the machine learning logic to employ a semantic knowledge and language processing operation to determine a satisfactory merging of conflicting configurations of at least two of the plurality of nodes, and wherein the satisfactory merging further includes identifying and implementing, by the machine learning logic, at least one combination of configurations of source nodes and the plurality of nodes in the target workflow to resolve the identified conflicts.

10. The computer program product of claim 9, further including program instructions to extract the one or more patches from the source workflow.

11. The computer program product of claim 9, further including program instructions to dynamically or statically apply the one or more patches to the target workflow.

12. The computer program product of claim 9, further including program instructions to:
  initialize of the plurality of nodes included in the one or more patches to be included in the target workflow, wherein the target workflow is active; and
  schedule those of the plurality of nodes active in the target workflow associated with the one or more patches.

13. A method for patching of workflows in a computing environment by one or more processors comprising:
  extracting one or more patches from a source workflow;
  identifying one or more splice points to apply one or more patches extracted from a source workflow to a target workflow in a plurality of nodes, wherein a splice point is a node in the target workflow providing an input to nodes identified in the one or more patches, and wherein the one or more splice points are automatically identified by executing machine learning logic to:
    generate, for each of the nodes identified in the one or more patches, input feature vectors,
    generate, for each node identified in a target workflow graph of the target workflow, target feature vectors,
    compare the input feature vectors with the target feature vectors, and
    select, as the splice point, the node in the target workflow based on the comparison;
  restricting any scheduling for additional nodes to the plurality of nodes while applying the one or more patches, even when upstream dependency nodes of the additional nodes are satisfied for execution, wherein tasks of existing nodes of the plurality of nodes, having already been scheduled for execution, continue to be scheduled;
  statically or dynamically modifying the target workflow in the plurality of nodes by applying the one or more patches to the target workflow;
  respectively adding, removing, and modifying one or more of the plurality of nodes in the target workflow while the target workflow is active in response to applying the one or more patches, wherein the removing of the one or more of the plurality of nodes is performed by labeling those of the one or more of the plurality of nodes to be removed on an initial to-delete list, performing a dependency analysis of each node on the initial to-delete list to incorporate dependent nodes of each node on the initial to-delete list into a final to-delete list, and terminating each node on the final to-delete list while notifying a scheduler to recognize the termination of each node a normal termination to abate the scheduler considering the termination as an error;
  identifying, by the machine learning logic, any conflicts between metadata defined in the one or more patches and those of the plurality of nodes in the target workflow; and
  generating one or more resolution actions to resolve any identified conflicts to enable the one or more patches compatible with the target workflow, wherein the one or more resolution actions include executing the machine learning logic to employ a semantic knowledge and language processing operation to determine a satisfactory merging of conflicting configurations of at least two of the plurality of nodes, and wherein the satisfactory merging further includes identifying and implementing, by the machine learning logic, at least one combination of configurations of source nodes and the plurality of nodes in the target workflow to resolve the identified conflicts.

14. A method for patching of workflows in a computing environment by one or more processors comprising:
- extracting one or more patches from a source workflow;
- identifying one or more splice points to apply one or more patches extracted from a source workflow to a target workflow in a plurality of nodes, wherein a splice point is a node in the target workflow providing an input to nodes identified in the one or more patches, and wherein the one or more splice points are automatically identified by executing machine learning logic to:
  - generate, for each of the nodes identified in the one or more patches, input feature vectors,
  - generate, for each node identified in a target workflow graph of the target workflow, target feature vectors,
  - compare the input feature vectors with the target feature vectors, and
  - select, as the splice point, the node in the target workflow based on the comparison;
- restricting any scheduling for additional nodes to the plurality of nodes while applying the one or more patches, even when upstream dependency nodes of the additional nodes are satisfied for execution, wherein tasks of existing nodes of the plurality of nodes, having already been scheduled for execution, continue to be scheduled;
- statically or dynamically modifying the target workflow in the plurality of nodes by applying the one or more patches to the target workflow;
- modifying a configuration of those of the plurality of nodes in the target workflow in response to applying the one or more patches;
- identifying and removing those of the plurality of nodes and any of the upstream dependency nodes, active or inactive in the target workflow, determined to be unnecessary in a performance of the target workflow according to the application of the one or more patches, wherein the removing of the one or more of the plurality of nodes is performed by labeling those of the one or more of the plurality of nodes to be removed on an initial to-delete list, performing a dependency analysis of each node on the initial to-delete list to incorporate dependent nodes of each node on the initial to-delete list into a final to-delete list, and terminating each node on the final to-delete list while notifying a scheduler to recognize the termination of each node a normal termination to abate the scheduler considering the termination as an error;
- identifying, by the machine learning logic, any conflicts between metadata defined in the one or more patches and those of the plurality of nodes in the target workflow; and
- generating one or more resolution actions to resolve any identified conflicts to enable the one or more patches compatible with the target workflow, wherein the one or more resolution actions include executing the machine learning logic to employ a semantic knowledge and language processing operation to determine a satisfactory merging of conflicting configurations of at least two of the plurality of nodes, and wherein the satisfactory merging further includes identifying and implementing, by the machine learning logic, at least one combination of configurations of source nodes and the plurality of nodes in the target workflow to resolve the identified conflicts.

* * * * *